(12) United States Patent
Anand et al.

(10) Patent No.: US 7,886,289 B2
(45) Date of Patent: Feb. 8, 2011

(54) EXTENSIBILITY MECHANISM FOR ANALYSIS SERVICES UNIFIED DIMENSIONAL MODEL

(75) Inventors: Thulusalamatom K. Anand, Redmond, WA (US); Paul J. Sanders, Seattle, WA (US); Richard R. Tkachuk, Sammamish, WA (US); Cristian Petculescu, Redmond, WA (US); Chu Xu, Kenmore, WA (US); Akshai M. Mirchandani, Redmond, WA (US); Valeri Kim, Redmond, WA (US); Andriy Garbuzov, Redmond, WA (US); C. James MacLennan, Redmond, WA (US); Marius Dumitru, Issaquah, WA (US); Ioan Bogdan Crivat, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 933 days.

(21) Appl. No.: 11/688,409

(22) Filed: Mar. 20, 2007

(65) Prior Publication Data

US 2008/0235180 A1    Sep. 25, 2008

(51) Int. Cl.
    G06F 9/44   (2006.01)
    G06F 7/00   (2006.01)
(52) U.S. Cl. .................. 717/168; 707/600
(58) Field of Classification Search ............ 717/120, 717/168; 707/600
    See application file for complete search history.

(56) References Cited

U.S. PATENT DOCUMENTS

| | | | |
|---|---|---|---|
| 6,014,647 A | 1/2000 | Nizzari et al. | |
| 6,424,878 B1 | 7/2002 | Barker et al. | |
| 6,868,413 B1 | 3/2005 | Grindrod et al. | |
| 7,100,195 B1* | 8/2006 | Underwood | 726/2 |
| 7,113,964 B1* | 9/2006 | Bequet et al. | 707/661 |
| 7,254,814 B1* | 8/2007 | Cormier et al. | 718/106 |
| 7,401,158 B2* | 7/2008 | Beauchamp et al. | 709/238 |
| 2002/0129345 A1 | 9/2002 | Tilden et al. | |
| 2003/0101251 A1 | 5/2003 | Low | |
| 2003/0120593 A1* | 6/2003 | Bansal et al. | 705/39 |
| 2003/0229652 A1* | 12/2003 | Bakalash et al. | 707/200 |
| 2004/0199572 A1* | 10/2004 | Hunt et al. | 709/201 |
| 2005/0102249 A1 | 5/2005 | Bigus | |
| 2005/0131924 A1* | 6/2005 | Jones | 707/100 |
| 2005/0278270 A1 | 12/2005 | Carr et al. | |
| 2005/0278458 A1 | 12/2005 | Berger et al. | |
| 2006/0085445 A1* | 4/2006 | Thanu | 707/100 |
| 2006/0095830 A1 | 5/2006 | Krishna et al. | |
| 2006/0253490 A1 | 11/2006 | Krishna et al. | |
| 2007/0073853 A1* | 3/2007 | Azizi et al. | 709/220 |
| 2007/0153342 A1* | 7/2007 | Sand et al. | 358/537 |

OTHER PUBLICATIONS

Moran, Brian and Russ Whitney, "Getting to Know OLAP and MDX", Windows IT Pro, Instant Doc #5112, Apr. 1999, pp. 1-4.*

(Continued)

*Primary Examiner*—Wei Y Chen
*Assistant Examiner*—Chih-Ching Chow
(74) *Attorney, Agent, or Firm*—Workman Nydegger

(57) ABSTRACT

Systems and methods that supply extensibility mechanisms for analysis services, via a plug-in component that enables additional functionalities. The plug-in component provide additional custom logic for the analysis services unified dimensional model (UDM). Accordingly, server functionalities can be extended in an agile manner, and without a requirement for a new release, for example.

18 Claims, 10 Drawing Sheets

OTHER PUBLICATIONS

Microstrategy, "Deliver the Highest Performance Industrial-Strength Reporting and Analysis to the Whole Enterprise", 2006, http://storagetek.ru/solutions_services/software_solutions/doc-m8i-000-brh-0-000000-012.pdf, pp. 1-12.*

Anand, "Analysis Services 2005 Processing Architecture", Jun. 2005, Microsoft SQL Server 9.0 Technical Articles, pp. 1-18.*

Michelle Dumler. Microsoft SQL Server 2005 Product Overview. http://download.microsoft.com/download/6/d/1/6d1121ba-1966-4e0f-ba41-c0060ddc800f/SQLServer2005ProdOvr.doc. Last accessed Feb. 12, 2007.

Michael Godfrey, et al. Secure and Portable Database Extensibility. http://delivery.acm.org/10.1145/280000/276339/p390-godfrey.pdf?key1=276339&key2=2139621711&coll=Portal&dl=GUIDE&CFID=74220359&CFTOKEN=92790055. Last accessed Feb. 12, 2007. pp. 390-401.

* cited by examiner

EXTENSIBILITY MECHANISM FOR ANALYSIS SERVICES UNIFIED DIMENSIONAL MODEL

BACKGROUND

The advent of a global communications network such as the Internet has perpetuated the exchange of enormous amounts of information. Additionally, the costs to store and maintain such information have declined, resulting in massive data storage structures, which can be accessed at a later time.

For example, history data can now be employed for analysis that supports business decisions at many levels, from strategic planning to performance evaluation of a discrete organizational unit. Such can further involve taking the data stored in a relational database and processing the data to make it a more effective tool for query and analysis. Accordingly, data warehousing and online analytical processing (OLAP) represent vital tools that support business decisions and data analysis. In general, a data warehouse is a nonvolatile repository for an enormous volume of organizational or enterprise information (e.g., 100 MB-TB). These data warehouses are populated at regular intervals with data from one or more heterogeneous data sources, for example from multiple transactional systems. Moreover, this aggregation of data provides a consolidated view of an organization from which valuable information can be derived. Even though the sheer volume can be overwhelming, the organization of data can help ensure timely retrieval of required information.

Data in data warehouses are often stored in accordance with a multidimensional database model. Such data can conceptually be represented as cubes with a plurality of dimensions and measures, rather than relational tables with rows and columns. A cube includes groups of data such as three or more "dimensions" and one or more "measures". Dimensions are a cube attribute that contain data of a similar type. Each dimension has a hierarchy of levels or categories of aggregated data. Accordingly, data can be viewed at different levels of detail. Measures represent real values that require analysis. The multidimensional model can further optimized to deal with large amounts of data. In particular, it allows users to execute complex queries on a data cube. For example, online analytical processing (OLAP) is almost synonymous with multidimensional databases.

OLAP is a key element in a data warehouse system, and describes category of technologies or tools utilized to retrieve data from a data warehouse. Such tools can extract and present multidimensional data from different points of view to assist and support managers and other individuals examining and analyzing data. The multidimensional data model is advantageous with respect to OLAP as it enables users to easily formulate complex queries, and readily filter or slice data into meaningful subsets, among other things. There exists two basic types of OLAP architectures MOLAP and ROLAP. MOLAP (Multidimensional OLAP) utilizes a true multidimensional database to store data. ROLAP (Relational OLAP) utilizes a relational database to store data and is mapped so that an OLAP tool sees the data as multidimensional. Thus, multidimensional databases are often generated from relational databases.

Such analysis tools help reduce access times for extreme amounts of data. For example, by employing these tools, a user can ask general questions or "queries" about the data rather than retrieve all the data verbatim. Thus, "data about data" or metadata helps expedite the query process and reduce the required network bandwidth. Moreover, there exists an increasing demand for a more customized information delivery, in light of the exponentially expanding sizes of data stores. In general, conventional analysis servers cannot be tailored according to a user's unique requirements.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The subject innovation supplies an extensibility mechanism for analysis services, via employing a plug-in component that enables additional functionalities. The plug-in component can be hosted by the analysis services, to supply additional custom logic (e.g., personalization, authentication, authorization, and the like) for the analysis services unified dimensional model (UDM), such as custom logic that is tailored for users, for example. Such plug-in component can be created by external entities (e.g., third parties), and incorporated into the analysis services (e.g., via extensibility hooks) to enable interception of various events (opening a cube, closing a cube, and the like) as required by the extensibility mechanism and related customized business logic. Accordingly, server functionalities can be extended in an agile manner (e.g., without a requirement for a new release). Moreover, when a user connects to the UDM—in addition to the base set of data and calculation that are developed by the developer—the user can also view personalized business logic created by the user (and/or created by user group members and shared).

In a related methodology, a performance management application (PM) can be personalized, wherein when an associated server starts up, the PM plug-in component can be created. The PM plug-in can determine when each user starts to open a session and close a session. The PM plug-in listens to events for session open and session close. When the user connects to the analysis server (e.g., an analyst connecting) a session is opened. The session can subsequently send an event to the PM plug-in, which indicates such opening of the session. Next, the PM plug-in can perform a look up (e.g., via a database) for the user for information pertaining thereto. The PM can subscribe to UDM, and subsequently MDX commands can be constructed, to generate business logic (e.g., customization via business rules that are performed by MDX language.) As such, functionality of OLAP servers can be extended, wherein business logic can be personalized to specific users, for example.

According to a further methodology, an authentication plug-in component can lookup for authentication events, wherein as soon as the user connects, the analysis services can raise authentication events. The authentication plug-in component can subsequently authenticate or deny access to the user. Upon a successful authentication (e.g., thru the authentication plug-in component), further access can be managed thru an authorization plug-in component. Hence, the analysis services can raise an event inquiring into authorization and access restrictions for the user. Such events can then be intercepted by the authorization plug-in component, which can subsequently verify type of access that should be granted to the user.

The following description and the annexed drawings set forth in detail certain illustrative aspects of the claimed subject matter. These aspects are indicative, however, of but a few of the various ways in which the principles of such matter may be employed and the claimed subject matter is intended to include all such aspects and their equivalents. Other advantages and novel features will become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
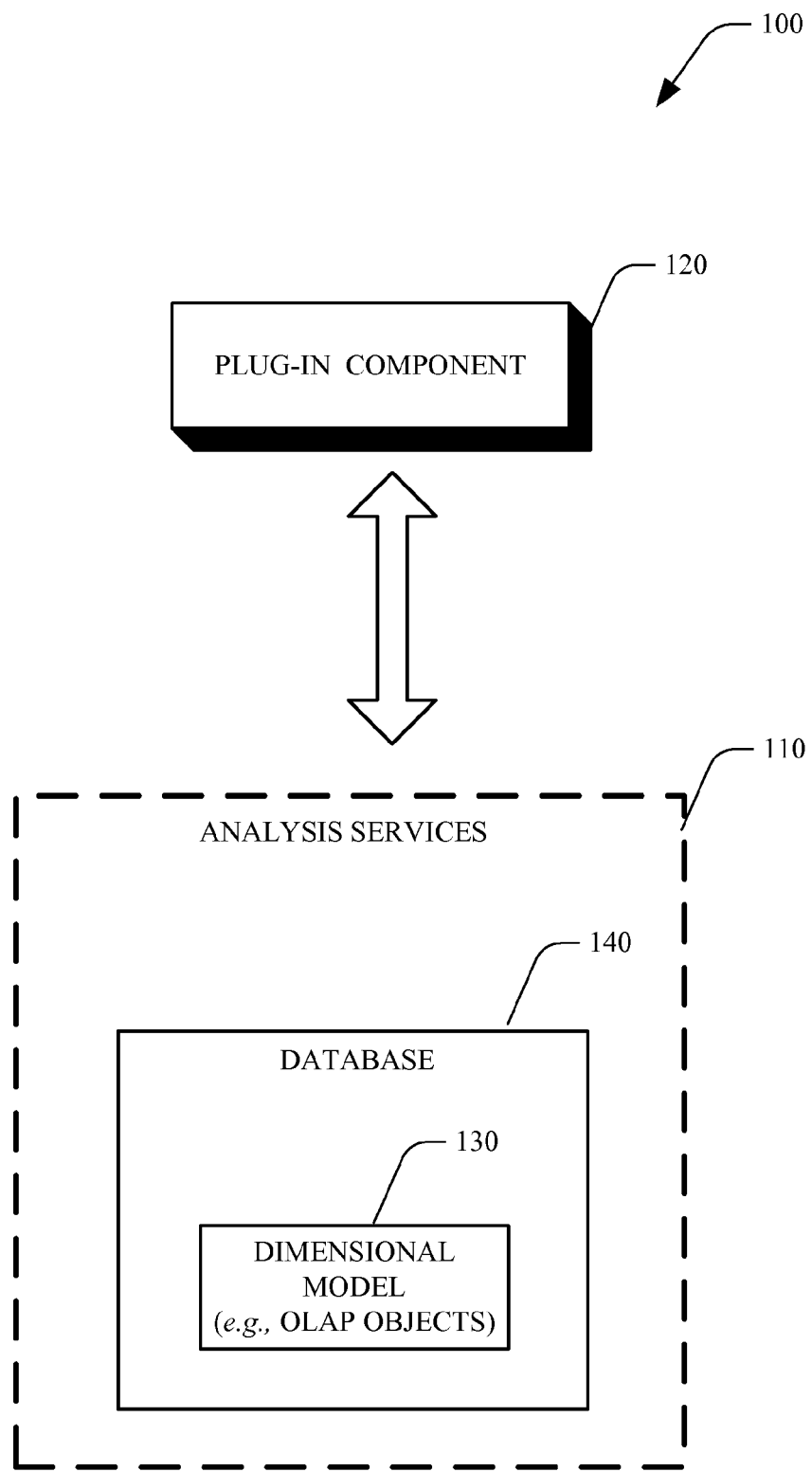
FIG. 1 illustrates a block diagram of an exemplary system for enabling additional functionalities for an analysis services, in accordance with an aspect of the subject innovation.

FIG. 1 illustrates a block diagram of an exemplary system 100 that enables additional functionalities for analysis services 110, via a plug-in component 120 in accordance with an aspect of the subject innovation. The plug-in component 120 can be hosted by the analysis services 110, to supply additional custom logic (e.g., personalization, authentication, authorization, and the like) for the analysis services unified dimensional model (UDM) 130 (e.g., custom logic that is tailored for users). The analysis services 110 can be associated with the multidimensional database 140, which employs a data model for organizing data that is optimized for data warehouses, online analytic processing (OLAP), and data mining applications. Conceptually, data in the multidimensional database 140 can be stored in cubes defined via multiple dimensions (i.e., three or more) and measures rather than tables, rows, and columns in a relational database. Dimensions are cube attributes that describe a similar set of members upon which a user may wish to base analysis. Furthermore, dimension categories or levels can be arranged hierarchically. For example, a time dimension may include levels for year, month, day, hour, and the like. A geography dimension may include levels for country, state, city and the like. Measures are the values, usually numeric, that are aggregated and analyzed.

The plug-in component 120 can be hosted by the analysis services 110, to supply additional custom logic (e.g., personalization, authentication, authorization, and the like) for the analysis services unified dimensional model (UDM) 140 (e.g., custom logic that is tailored for users). Moreover, when a user connects to the UDM, in addition to the base set of data and calculation that are developed by the developer, the user can also view personalized business logic created by the user (and/or created by user group members and shared), for example.

Hence, Multi-Dimensional eXpressions (MDX) commands can be constructed, to generate business logic based on user preferences. MDX is a syntax that supports the definition and manipulation of multidimensional objects and data thereby facilitating the access of data from multiple dimensions easier and more intuitive. MDX is similar in many ways to the SQL (Structured Query Language) syntax (but is not an extension of the SQL language). As with an SQL query, each MDX query requires a data request (the SELECT clause), a starting point (the FROM clause), and a filter (the WHERE clause). These and other keywords provide the tools used to extract specific portions of data from a cube for analysis. MDX also supplies a robust set of functions for the manipulation of retrieved data, as well as the ability to extend MDX with user-defined functions. Hence, MDX can facilitate customization via business rules. The plug-in component(s) 120 can be an API, a vendor product, application, software, an interface, a GUI, and the like, which can additionally invoke a particular activity to be performed (e.g., such as transfer to device, transfer to CD, upload to website, and the like). It is to be appreciated that a plurality of plug-in component(s) 120 can be employed in conjunction with the analysis services, to extend a functionality thereof.

For example, the following illustrates a sample C# code that represents the use of the personalization extensions for a plug-in, in accordance with a particular aspect of the subject innovation:

```
using System;
using System.Collections.Generic;
using System.Text;
using Microsoft.AnalysisServices.AdomdServer;
namespace PasPlugIn
{
  [PlugInAttribute]
  public class PasPlugIn
  {
    public PasPlugIn( )
    {
      // Initialization
      ...
      // Subscribe to session events
      Context.Server.SessionOpened += new
EventHandler(OnSessionOpen);
      Context.Server.SessionClosing += new
EventHandler(OnSessionClose);
    }
```

-continued

```
    public void OnSessionOpen(object sender, EventArgs e)
    {
        AdomdConnection connection = Context.CurrentConnection;
        IIdentity user = Context.CurrentConnection.User;
        // If the current user has personalization, then instantiate
        // a PasSession object
        if (HasPersonalization(user.Name))
            PasSession pasSession = new PasSession(this, connection);
        // No need to hold a reference to the PasSession object since
        // the event subscription will do that
    }
    public void OnSessionClose(object sender, EventArgs e)
    {
        // The AdomdConnection object will be deleted when the session
        // is closed and this will release any event subscriptions from
        // the PasSession object
        // Any cleanup associated with current session
        ...
    }
}
public class PasSession
{
    PasPlugIn pasPlugIn;
    public PasSession(PasPlugIn pasPlugIn, AdomdConnection connection)
    {
        this.pasPlugIn = pasPlugIn;
        // Subscribe to cube events
        connection.CubeOpened += new EventHandler(OnCubeOpen);
        connection.CubeClosing += new EventHandler(OnCubeClose);
        connection.CubeRefreshing += new EventHandler(OnCubeRefresh);
    }
    public void OnCubeOpen(object sender, EventArgs e)
    {
        CubeDef cube = Context.CurrentCube;
        IIdentity user = Context.CurrentConnection.User;
        // If the current user has personalization for this cube, then
        // retrieve the list of personalization commands and execute them
        if (HasPersonalization(user.Name, cube.Name))
        {
            String[ ] mdxCommands = GetPersonalization(user.Name, cube.Name);
            AdomdCommand cmd = new AdomdCommand( );
            foreach (string mdx in mdxCommands)
            {
                cmd.CommandText = mdx;
                cmd.ExecuteNonQuery( );
            }
        }
    }
    public void OnCubeClose(object sender, EventArgs e)
    {
        // Any cleanup associated with current cube
        ...
    }
    public void OnCubeRefresh(object sender, EventArgs e)
    {
        CubeDef cube = Context.CurrentCube;
        IIdentity user = Context.CurrentConnection.User;
        if (!IsPersonalizationUpToDate(user.Name, cube.Name))
        {
            String[ ] mdxCommands = GetPersonalization(user.Name, cube.Name);
            AdomdCommand cmd = new AdomdCommand( );
            foreach (string mdx in personalizedCommands)
            {
                cmd.CommandText = mdx;
                cmd.ExecuteNonQuery( );
            }
        }
    }
}
```

Figure 2:
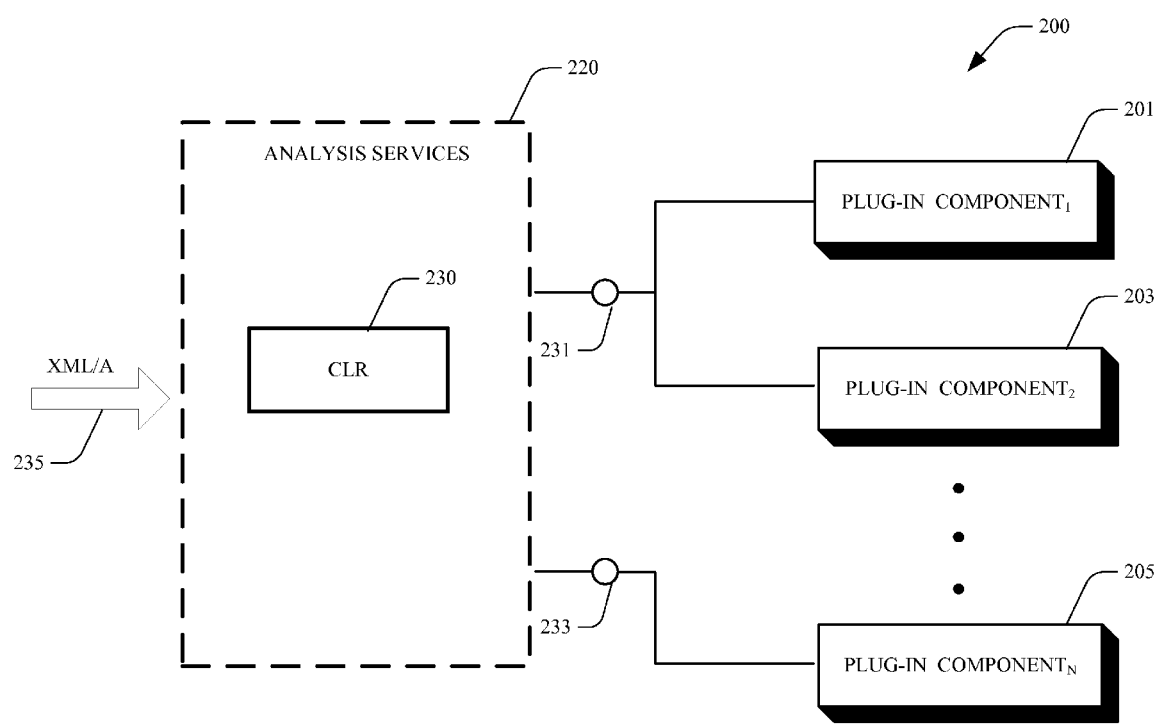
FIG. 2 illustrates a block diagram of incorporating a plurality of plug-in components to extend functionalities of the analysis services in accordance with an aspect of the subject innovation.

FIG. 2 illustrates a block diagram of incorporating a plurality of plug-in components 201, 203, 205 (1 thru N, N being an integer) to extend functionalities of the analysis services in accordance with an aspect of the subject innovation. For example, the plug-in component 201 is associated with personalization, and be created when the server associated with analysis services 220 starts. Such personalization plug-in component 201 can determine when each user starts to open a session and close a session. For example, the plug-in component 201 can listen to events for session open and session close. When the user connects to the analysis server (e.g., an anlayst connecting) a session is opened. The session can subsequently send an event to the PM plug-in component, which indicates such opening of the session. Typically, a plug-in component can be in form of a common language runtime (CLR assembly), wherein it can be installed (and uninstalled) on the SQL server analysis server (SSAS) (e.g., by employing an object model.) Moreover, the exemplary common language runtime 230 can include an intermediate language compiler such as a just-in-time (JIT) compiler (not shown), which is operable to compile intermediate language code into native code, for example. As illustrated in FIG. 2, the eXtensible Markup Language/Analysis 235 can be implemented in conjunction with a queue forwarded to the analysis services 220.

Likewise, the plug-in component 203 can associate with authorization. Such authorization plug-in component 203 can lookup for authentication events. For example, as soon as the user connects and is authenticated, an event regarding an authentication can be sent to the authorization plug-in component 203. The sequence authentication can then verify the password, and upon approval enables connection to the analysis services. The plug-in components 201, 203, 205 can be created by external entities (e.g., third parties), and incorporated into the analysis services via extensibility hooks 231, 233 (e.g., programmatic interfaces).

Figure 3:
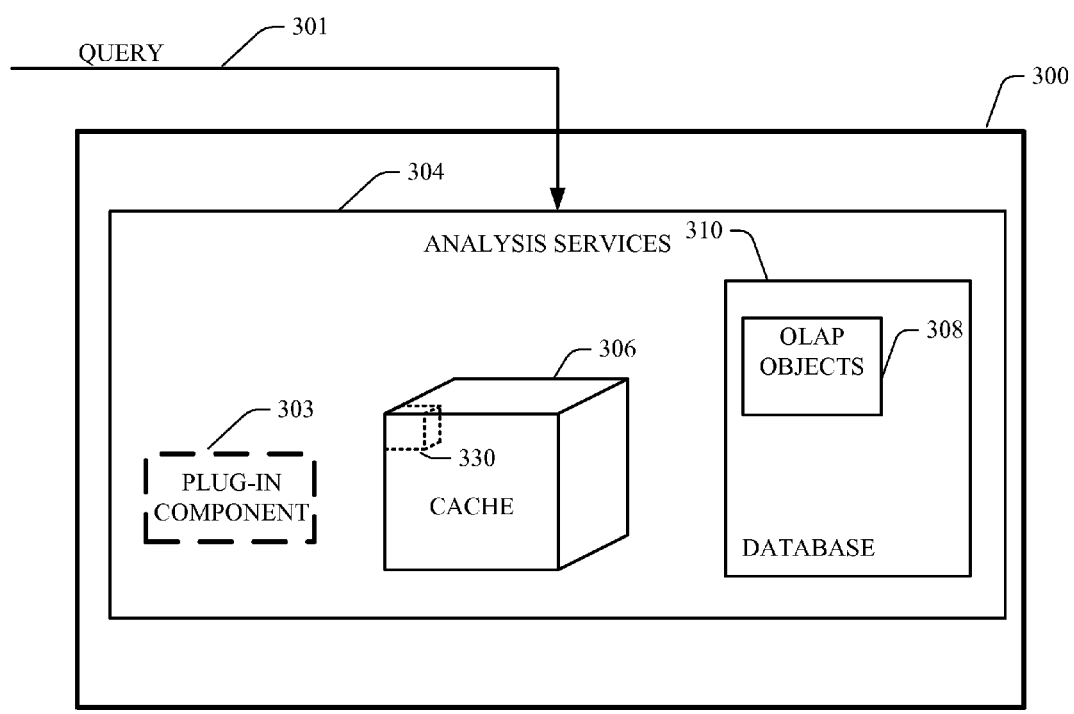
FIG. 3 illustrates a block diagram of a database serving system with analysis services that employs a plug-in component in accordance with an aspect of the subject innovation.

FIG. 3 illustrates a block diagram of a database serving system 300 with analysis services 304 that employs a plug-in component 303 in accordance with an aspect of the subject innovation. The plug-in component 303 can be created by external entities (e.g., third parties), and incorporated into the analysis services 304 via extensibility hooks, to enable interception of various events (opening a cube, closing a cube, and the like) as required by extensibility mechanism and related customized business logic. The extensibility hooks can function as interfaces to provide access to the analysis services, wherein the plug-in component 303 can be created by external entities.

Accordingly, server functionalities can be extended in an agile manner (e.g., without a requirement for a new release). Moreover, when a user connects to the UDM, in addition to the base set of data and calculation that are developed by the developer, the user can also view personalized business logic created by the user (and/or created by user group members and shared).

The database serving system 300 can be comprised of a caching system 306, multidimensional objects 308, such as "OLAP objects" and the like, and a database 310 with a capability of accepting updates. The caching system 306 can include an analysis component (not shown) and a cache subset 330. The database serving system 300 can supply analysis for query 301 and response to users via the cache system 306.

The plug-in component 303 can be incorporated into the analysis services (e.g., via extensibility hooks) to enable interception of various events (opening a cube, closing a cube, and the like) as required by extensibility mechanism and related customized business logic. Accordingly, server functionalities can be extended in an agile manner (e.g., without a requirement for a new release). Moreover, when a user connects to the UDM, in addition to the base set of data and calculation that are developed by the developer, the user can also view personalized business logic created by the user (and/or created by user group members and shared).

Figure 4:
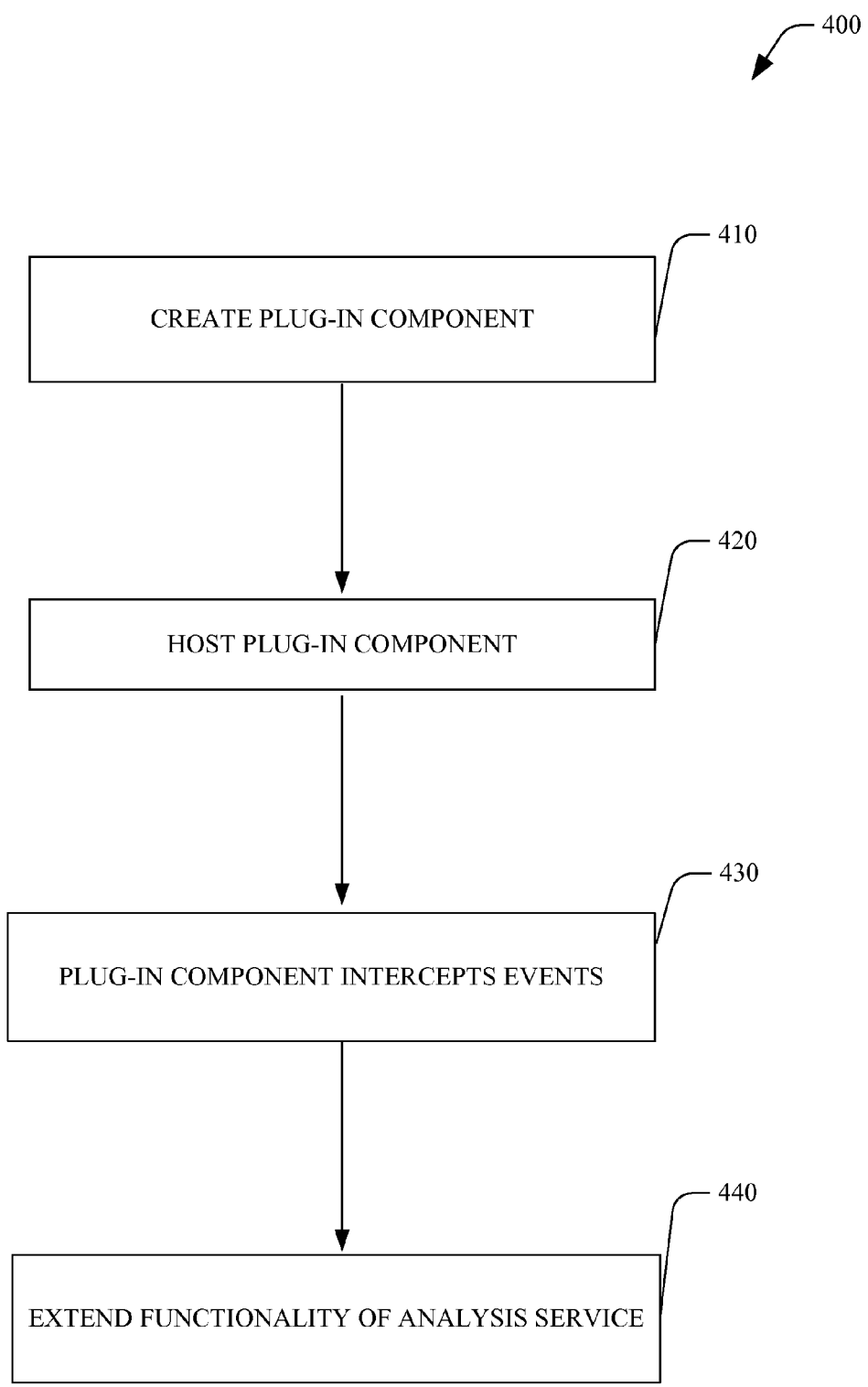
FIG. 4 illustrates a methodology of hosting a plug-in component in accordance with an aspect of the subject innovation.

FIG. 4 illustrates a methodology 400 of hosting a plug-in component in accordance with an aspect of the subject innovation. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described. Initially and at 410, plug-in components for the analysis services can be created by external entities such as third parties, to address requirements of a user. For example, in a sales and marketing scenario, the user may require presentation of sales data in a particular manner and for a period (e.g., which is not deemed important by other users, and hence not directly incorporated in the analysis services itself.) Next and at 420, the plug-in component is then hosted by the analysis services (e.g., server can load plug-in components assemblies upon startup and instantiate a plug-in object for each of the plug-in components.

Subsequently and at 430, the plug-in component intercepts various events as required by extensibility mechanism and related customized business logic. For example, these events can include opening a cube, closing a cube, related to personalization, authentication, authorization, and the like. Next and at 440, functionality of the analysis services (e.g., OLAP servers) can be extended, wherein business logic can be personalized to specific users.

Figure 5:
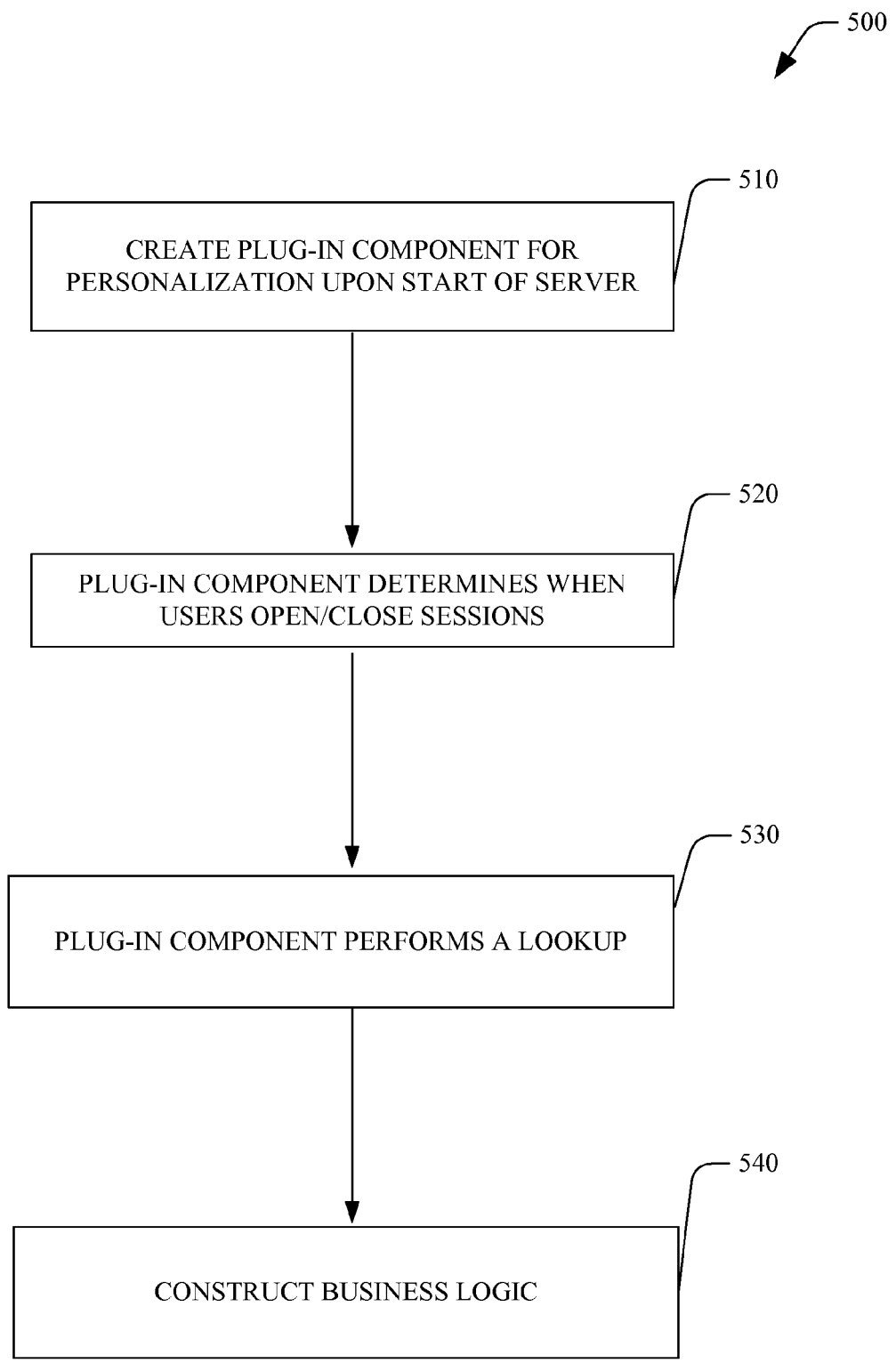
FIG. 5 illustrates a further methodology of hosting a personalization plug-in component to extend functionalities of the analysis services in accordance with an aspect of the subject innovation.

FIG. 5 illustrates a further methodology 500 of hosting a personalization plug-in component to extend functionalities of the analysis services in accordance with an aspect of the subject innovation. Initially, and at 510 the server starts and creates the PM plug-in component, wherein the PM plug-in component can listen to events for session open and session close.

For example, upon start up, the servers can iterate through all server assemblies and looks for classes with a predetermined attribute, for instance PlugInAttribute. Such PlugInAttribute attribute designates a CLR class as an SSAS plug-in, e.g.,

```
class PlugInAttribute : System.Attribute
{
    public PlugInAttribute (void);
}
```

For each such class, it instantiates an object and invokes the default constructor, which in turn can subscribe to events. In general, the server does not maintain an explicit reference to the plug-in object. Rather the delegate used for event subscription would hold a reference to the object (as per .NET delegate semantics). Hence, if the plug-in does not subscribe to any events, it will be cleaned.

Accordingly and at 520, the PM plug-in component can determine when each user starts to open a session and close a session. Next and at 530, the PM plug-in component can perform a look up (e.g., via a database) for the user for information pertaining thereto. Subsequently and at 540, the PM can subscribe to UDM, and associated MDX commands can be constructed.

Figure 6:
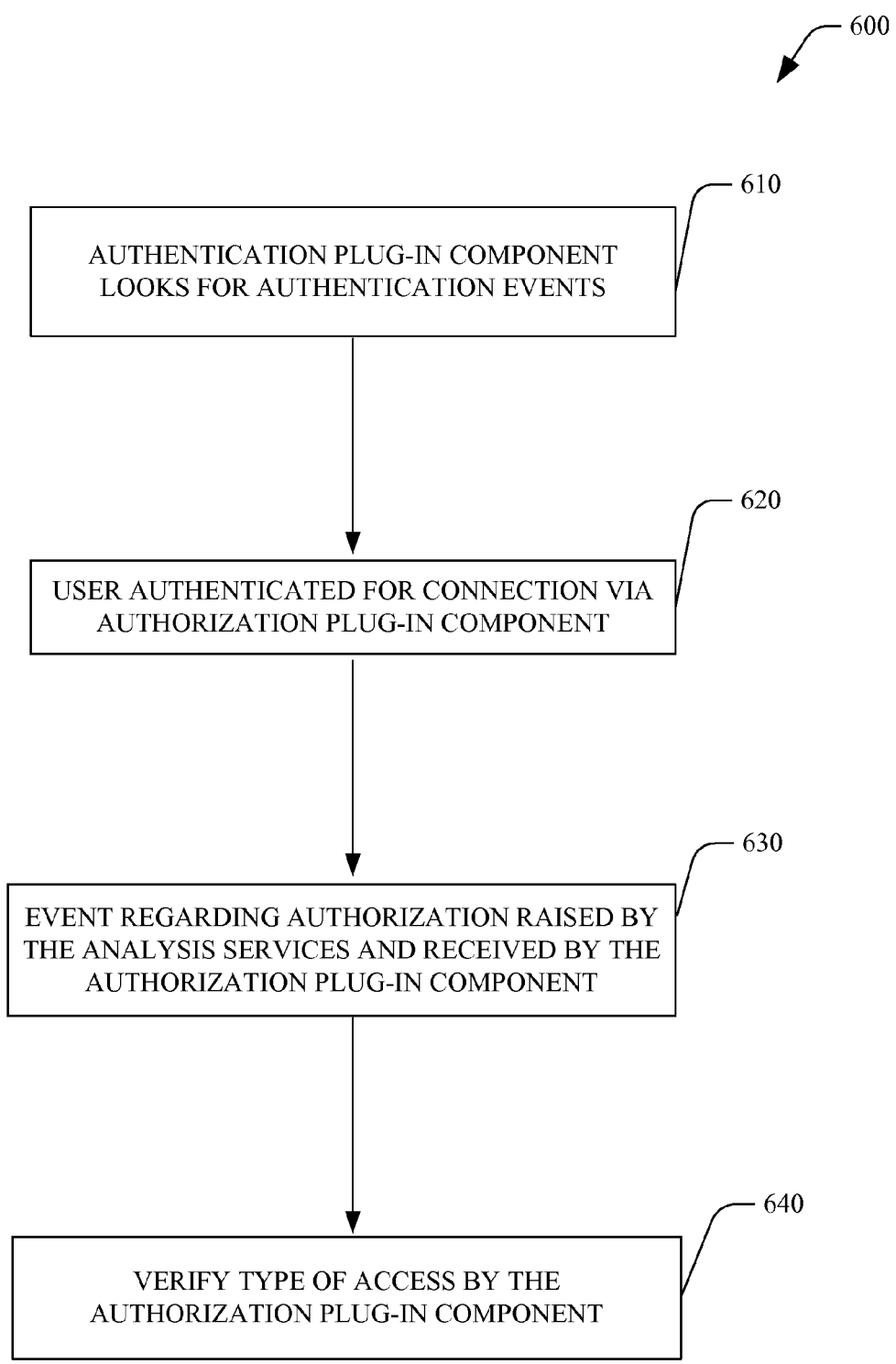
FIG. 6 illustrates a related methodology of incorporating a plug-in component as part of analysis services, for authorization in accordance with an aspect of the subject innovation.

FIG. 6 illustrates a related methodology 600 of incorporating plug-in components as part of analysis services, for authentication and authorization in accordance with an aspect of the subject innovation. Initially and at 610, the authentication plug-in component can lookup for authentication events upon user connection. At 620 the user can connect and is authenticated for such connection via the authentication plug-in component. Subsequently and at 630, an event regarding user authorization can be raised by the analysis services inquiring into authorization and access restrictions for such user. At 640, the authorization plug-in component can extend analysis server functionality and verify type of access for the authenticated user.

Figure 7:
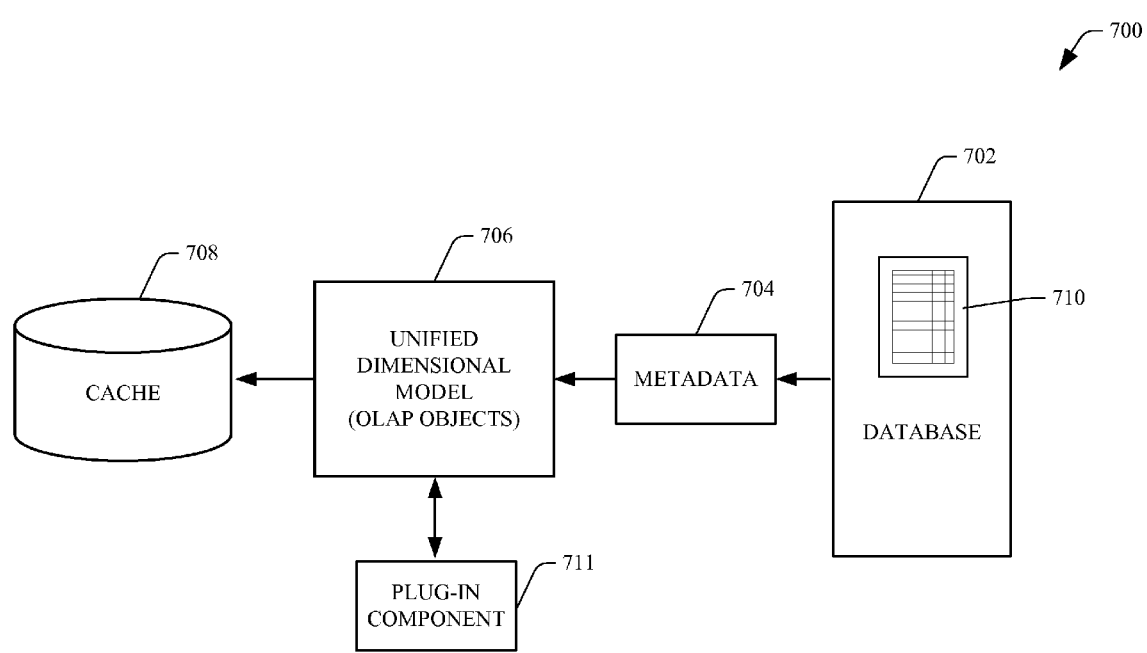
FIG. 7 illustrates a block diagram of analysis services that employs a plug-in component in accordance with an aspect of the subject innovation.

FIG. 7 illustrates a block diagram of analysis services 700 that employs a plug-in component 711 in accordance with an aspect of the subject innovation. As explained in detail above, the plug-in component 711 can be hosted by the analysis services 700, to supply additional custom logic (e.g., personalization, authentication, authorization, and the like) for the unified dimensional model (UDM) 706 (e.g., custom logic that is tailored for users). As illustrated, the analysis services 700 includes a database table 710, the metadata set 704, the dimensional model (multidimensional objects such as "OLAP objects" and the like) 706, and the cache 708. Typically, information about data from the database 702 is compiled into the metadata set 704. Metadata objects are constructed from the metadata set 704 to form the dimensional model 706. The dimensional model 706 usually includes dimensions, cubes, and measures and the like. Such allows an OLAP management tree to access the metadata objects in the dimensional model 706. Accordingly, server functionalities can be extended in an agile manner (e.g., without a requirement for a new release). Moreover, when a user connects to the UDM, in addition to the base set of data and calculation that are developed by the developer, the user can also view personalized business logic created by the user (and/or created by user group members and shared).

Figure 8:
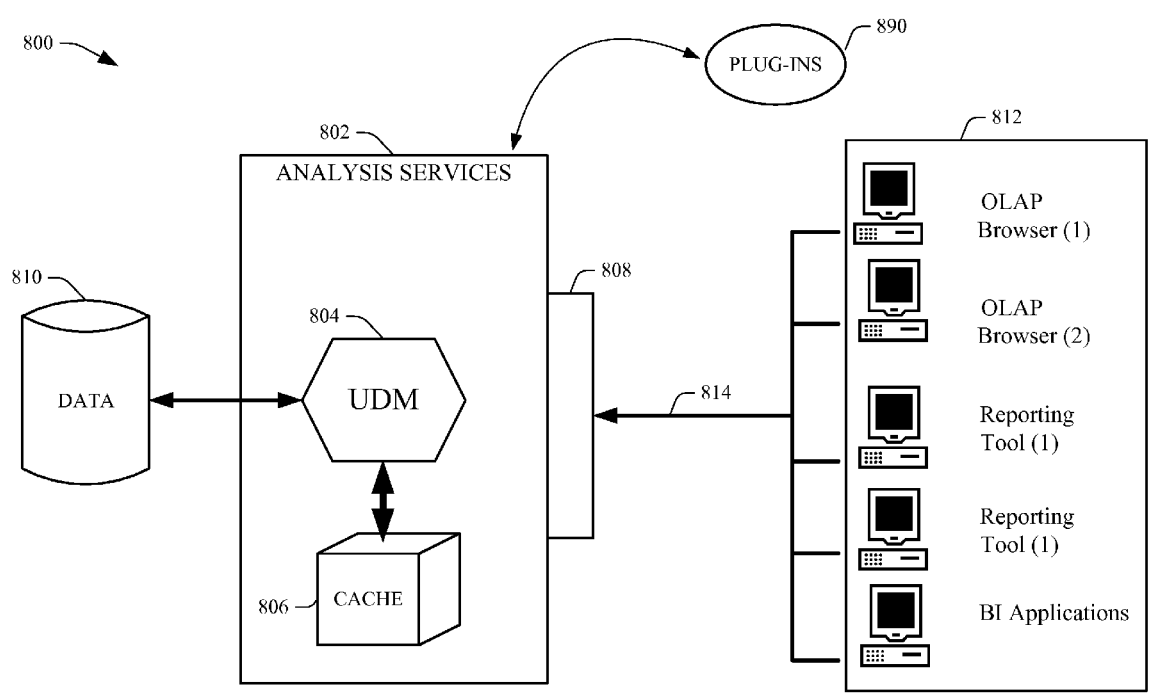
FIG. 8 illustrates an online analytical processing (OLAP) environment that hosts plug-ins in accordance with an aspect of the subject innovation.

FIG. 8 illustrates a further block diagram 800 that can employ plug-ins 890 in accordance with an aspect of the subject innovation. This typical environment 800 comprises an analysis services component 802 linked to a data source 810 and user interfaces 812. The user interfaces 812 are comprised of OLAP browsers, reporting tools, and other BI (Business Intelligence) applications and the like. The analysis services component 802 typically has an interface 814 with the user interfaces 812 via interfaces 808 like XML/A (eXtensible Markup Language/Analysis) and MDX (Multidimensional Exchange Language) and the like. The analysis services component 802 is comprised of a UDM (Unified Dimensional Model) component 804 and a cache 806. In this example, the plug-ins 890 can be hosted by the analysis services component 802 via the UDM component 804 and the cache 806. The UDM component can proactively access the cache 806 and/or the data directly. When a user connects to the UDM 804, (in addition to the base set of data and calculation that are developed by the developer) the user can also view personalized business logic created by the user (and/or created by user group members and shared). It is to be appreciated that as users employ the same functionality for a plug-ins over and over, such functionality can become a core component of the analysis server 802 by developers thereof.

As used in herein, the terms "component," "system" and the like are intended to refer to a computer-related entity, either hardware, a combination of hardware and software, software or software in execution. For example, a component can be, but is not limited to being, a process running on a processor, a processor, an object, an instance, an executable, a thread of execution, a program and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner. It is to be appreciated that a myriad of additional or alternate examples could have been presented, but have been omitted for purposes of brevity.

Furthermore, all or portions of the subject innovation can be implemented as a system, method, apparatus, or article of manufacture using standard programming and/or engineering techniques to produce software, firmware, hardware or any combination thereof to control a computer to implement the disclosed innovation. Computer readable media, for example, can be used to store computer executable instructions which when executed perform the functionality of the invention. Computer readable media can be divided into two separate categories: computer storage media, and communication media. Computer storage media include magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Communication media includes carrier waves which can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 9:
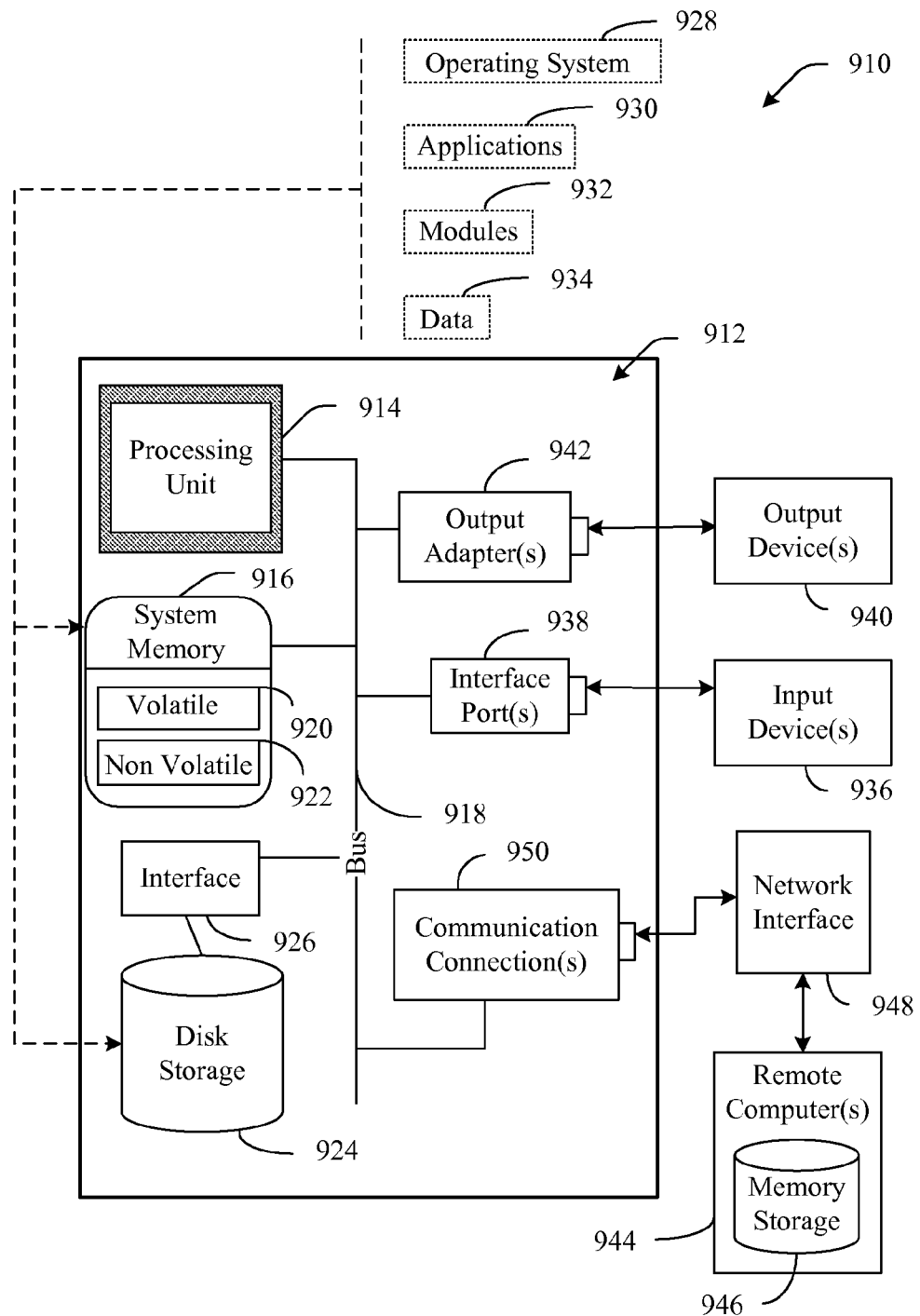
FIG. 9 illustrates an exemplary operating environment for implementing various aspects of the subject innovation.
Figure 10:
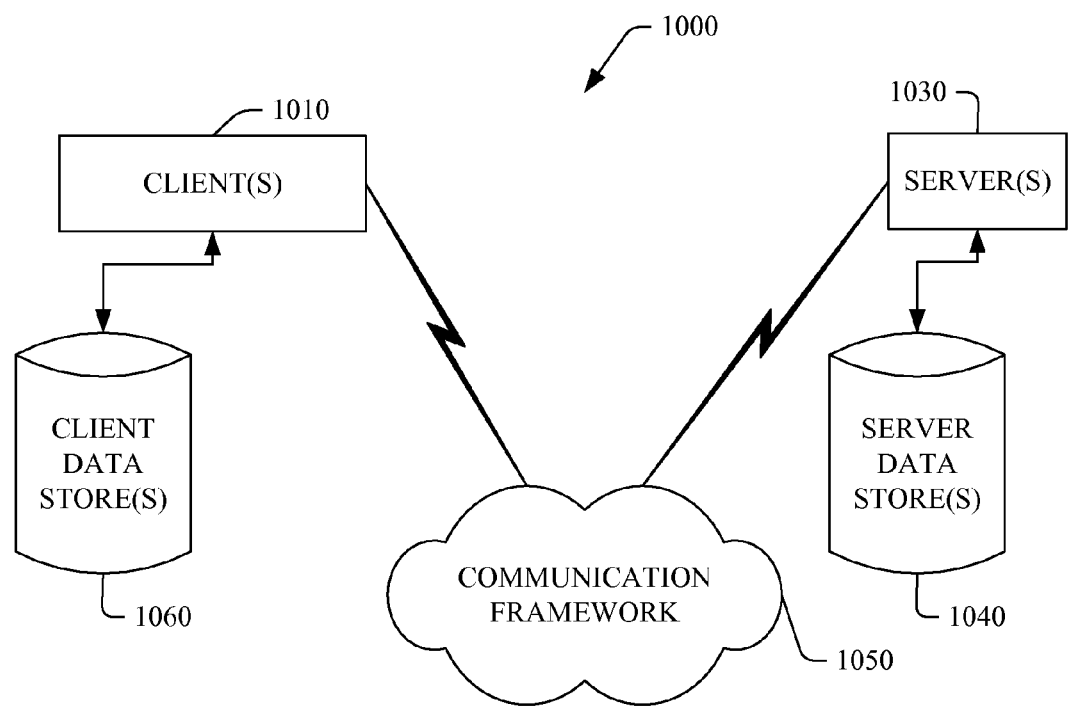
FIG. 10 illustrates a schematic block diagram of a sample computing environment with which the subject innovation can interact.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the innovation also may be implemented in combination with other program modules. Generally, program modules include routines, programs, components, data structures, and the like, which perform particular tasks and/or implement particular abstract data types. Moreover, those skilled in the art will appreciate that the innovative methods can be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the innovation can be practiced on stand-alone computers. In a distributed computing environment, program modules may be located in both local and remote memory storage devices.

With reference to FIG. 9, an exemplary environment 910 for implementing various aspects of the subject innovation is described that includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates a disk storage 924, wherein such disk storage 924 includes, but is not limited to, devices like a magnetic disk drive, floppy disk drive, tape drive, Jaz drive, Zip drive, LS-60 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that various components described herein can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

FIG. 10 is a schematic block diagram of a sample-computing environment 1000 that can be employed as part of a plug-in component in accordance with an aspect of the subject innovation. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the components described herein, for example. One possible communication between a client 1010 and a server 1030 may be in the form of a data packet adapted to be transmitted between two or more computer processes. The system 1000 includes a communication framework 1050 that can be employed to facilitate communications between the client(s) 1010 and the server(s) 1030. The client(s) 1010 are operatively connected to one or more client data store(s) 1060 that can be employed to store information local to the client(s) 1010. Similarly, the server(s) 1030 are operatively connected to one or more server data store(s) 1040 that can be employed to store information local to the servers 1030.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims.

Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, performed by a computer, of extending the functionality of an analysis services by hosting plug-ins, the method comprising:

storing one or more assemblies that each include one or more plug-ins on an Online Analytical Processing (OLAP) server for extending the functionality of an analysis services provided by the OLAP server, the one or more plug-ins each comprising a common language runtime (CLR) class that includes a predetermined attribute that identifies the CLR class as a plug-in;

upon start up of the OLAP server, iterating through the one or more assemblies on the OLAP server to identify each class in the one or more assemblies that includes the predetermined attribute that identifies the CLR class as a plug-in;

for each identified class having the predetermined attribute, instantiating a plug-in object that subscribes to one or more events, including subscribing to a start up event indicating that a user has opened a session with the analysis services provided by the OLAP server;

upon receiving notification of the start up event, each instantiated plug-in object performing a look up for the user associated with the start up event to obtain one or more Multi-Dimensional eXpressions (MDX) commands which the user has registered to be executed to personalize the functionality of the analysis services; and executing each of the one or more MDX commands to personalize the functionality of the analysis services.

2. The method of claim 1 wherein the one or more plug-ins further include an authentication plug-in that registers to receive notification of authentication events, wherein the method further comprises:

upon receiving notification of an authentication event, the authentication plug-in executing customized logic to authenticate the user.

3. The method of claim 1 wherein personalizing the functionality of the analysis services comprises modifying the view of a unified dimensional model in a manner that is not provided by the analysis services.

4. The method of claim 1 wherein the predetermined attribute is [PlugInAttribute].

5. The method of claim 1 wherein at least one of the plug-in objects also subscribes to a close event indicating that the user has closed the session with the analysis services, the method further comprising:

upon receiving notification of the close event, the at least one plug-in object executing customized logic to extend the functionality of the analysis services.

6. The method of claim 1, wherein the one or more plug-ins further include an authorization plug-in that registers to receive notification of access events, wherein the method further comprises:

upon receiving notification of an access event indicating that the user is attempting to access a unified dimensional model provided by the analysis services, the authorization plug-in executing customized logic to verify whether the user's access is to be permitted.

7. One or more computer storage media storing computer executable instructions which when executed perform a method of extending the functionality of an analysis services by hosting plug-ins, the method comprising:

storing one or more assemblies that each include one or more plug-ins on an Online Analytical Processing (OLAP) server for extending the functionality of an analysis services provided by the OLAP server, the one or more plug-ins each comprising a common language runtime (CLR) class that includes a predetermined attribute that identifies the CLR class as a plug-in;

upon start up of the OLAP server, iterating through the one or more assemblies on the OLAP server to identify each class in the one or more assemblies that includes the predetermined attribute that identifies the CLR class as a plug-in;

for each identified class having the predetermined attribute, instantiating a plug-in object that subscribes to one or more events, including subscribing to a start up event indicating that a user has opened a session with the analysis services provided by the OLAP server;

upon receiving notification of the start up event, each instantiated plug-in object performing a look up for the user associated with the start up event to obtain one or more Multi-Dimensional eXpressions (MDX) commands which the user has registered to be executed to personalize the functionality of the analysis services; and executing each of the one or more MDX commands to personalize the functionality of the analysis services.

8. The one or more computer storage media of claim 7 wherein the one or more plug-ins further include an authentication plug-in that registers to receive notification of authentication events, wherein the method further comprises:

upon receiving notification of an authentication event, the authentication plug-in executing customized logic to authenticate the user.

9. The one or more computer storage media of claim 7 wherein personalizing the functionality of the analysis services comprises modifying the view of a unified dimensional model in a manner that is not provided by the analysis services.

10. The one or more computer storage media of claim 7 wherein the predetermined attribute is [PlugInAttribute].

11. The one or more computer storage media of claim 7 wherein at least one of the plug-in objects also subscribes to a close event indicating that the user has closed the session with the analysis services, the method further comprising:

upon receiving notification of the close event, the at least one plug-in object executing customized logic to extend the functionality of the analysis services.

12. The one or more computer storage media of claim 7, wherein the one or more plug-ins further include an authorization plug-in that registers to receive notification of access events, wherein the method further comprises:

upon receiving notification of an access event indicating that the user is attempting to access a unified dimensional model provided by the analysis services, the authorization plug-in executing customized logic to verify whether the user's access is to be permitted.

13. A system comprising a processor and memory storing computer executable instructions which when executed by the processor perform a method of extending the functionality of an analysis services by hosting plug-ins, the method comprising:

storing one or more assemblies that each include one or more plug-ins on an Online Analytical Processing (OLAP) server for extending the functionality of an analysis services provided by the OLAP server, the one or more plug-ins each comprising a common language runtime (CLR) class that includes a predetermined attribute that identifies the CLR class as a plug-in;

upon start up of the OLAP server, iterating through one or more assemblies on the OLAP server to identify each class in the one or more assemblies that includes the predetermined attribute;

for each identified class having the predetermined attribute, instantiating a plug-in object that subscribes to one or more events, including subscribing to a start up event indicating that a user has opened a session with the analysis services provided by the OLAP server;

upon receiving notification of the start up event, each instantiated plug-in object performing a look up for the user associated with the start up event to obtain one or more Multi-Dimensional eXpressions (MDX) commands which the user has registered to be executed to personalize the functionality of the analysis services; and executing each of the one or more MDX commands to personalize the functionality of the analysis services.

14. The system of claim 13 wherein the one or more plug-ins further include an authentication plug-in that registers to receive notification of authentication events, wherein the method further comprises:

upon receiving notification of an authentication event, the authentication plug-in executing customized logic to authenticate the user.

15. The system of claim 13 wherein personalizing the functionality of the analysis services comprises modifying the view of a unified dimensional model in a manner that is not provided by the analysis services.

16. The system of claim 13 wherein the predetermined attribute is [PlugInAttribute].

17. The system of claim 13 wherein at least one of the plug-in objects also subscribes to a close event indicating that the user has closed the session with the analysis services, the method further comprising:
 upon receiving notification of the close event, the at least one plug-in object executing customized logic to extend the functionality of the analysis services.

18. The system of claim 13, wherein the one or more plug-ins further include an authorization plug-in that registers to receive notification of access events, wherein the method further comprises:
 upon receiving notification of an access event indicating that the user is attempting to access a unified dimensional model provided by the analysis services, the authorization plug-in executing customized logic to verify whether the user's access is to be permitted.

* * * * *